July 28, 1936.   H. H. PERRY   2,048,966

RECEPTACLE FOR MUSHROOM SPAWN CULTURE

Filed April 10, 1936

INVENTOR

Henry H. Perry
BY
ATTORNEYS.

WITNESS:

Patented July 28, 1936

2,048,966

UNITED STATES PATENT OFFICE 2,048,966

RECEPTACLE FOR MUSHROOM SPAWN CULTURE

Henry H. Perry, Bryn Mawr, Pa., assignor to Brandywine Mushroom Corporation, West Chester, Pa., a corporation of Delaware Application April 10, 1936, Serial No. 73,614

5 Claims. (Cl. 47—37)

This invention relates to receptacles for containing mushroom spawn during its development.

At present it is customary to employ bottles similar to milk bottles as containers for mushroom spawn during its development. Such containers are first filled with carefully prepared manure or other growing medium into which an opening is drilled extending axially along the bottle. Following sterilization of the contents they are inoculated with mushroom spawn by locating within the drilled opening two fragments of spore-containing material which may be located respectively near the bottom and top of the hole. The bottle is then closed by means of a cotton or similar plug of porous nature and set aside for the proper period of development. During this development it is essential that access to the exterior be provided through the porous plug to provide for "breathing." The fibrous plug, of course, is used to prevent contamination.

When the above procedure is adopted, it is found that there is considerable overdevelopment at the open end where air may enter through the porous plug. If the growth is stopped when the spawn adjacent the open end of the bottle is properly developed, the remaining portions may be underdeveloped. Proper development, neither overdevelopment nor underdevelopment, is necessary in order that growth will take place properly after planting in the beds.

It is the object of the present invention to provide a receptacle in which two or more openings are provided in such fashion as to promote the circulation of air during the growing period and consequently the more uniform development of the entire body. At the same time the type of receptacle provided by the present invention is of such nature that it may be readily loaded and also emptied as compared with the milk bottle type of container heretofore used, which had to be broken in order to remove the spawn and which, furthermore, was difficult to load because of the restricted opening. To promote standardization of practice, it has been customary to provide bottles of a particular size giving a definite size cake of spawn which was broken up in a standardized fashion with the result that the mushroom grower was always certain that he was introducing the proper size pieces into the mushroom beds. In accordance with the present invention, each container is preferably arranged to provide some multiple of the amount of spawn provided by the containers heretofore used. In the simplest embodiment of the invention, each container has double the standard volume and two cakes are grown therein of equal size, preferably separated by means of a removable partition.

The above and other objects of the invention will be apparent from the following description read in conjunction with the accompanying drawing, in which.

Figure 1:
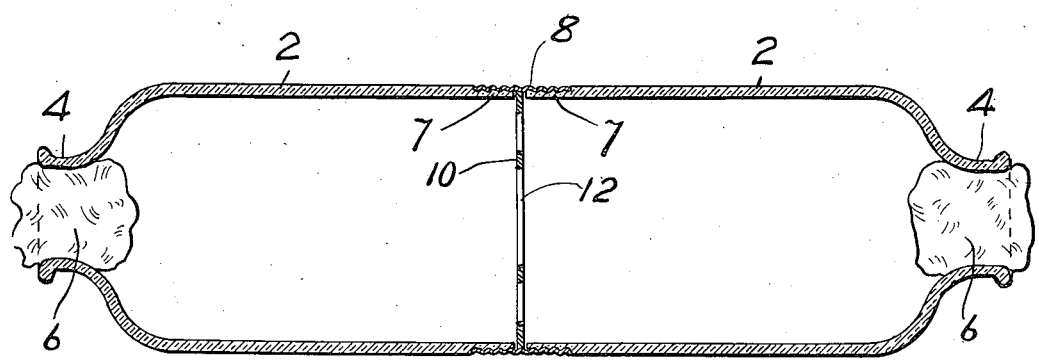
Fig. 1 is a longitudinal sectional view showing a container in accordance with the preferred embodiment of the invention; and—

Referring first to the modification of Fig. 1, there are indicated at 2 the two sections of the improved type of container. Each of these may be substantially the shape and volume of the milk bottle type of container heretofore used. However, its end opposite its neck is open and its internal walls may be cylindrical or tapered outwardly toward the open end, while adjacent the neck 4 conventional curvature may be provided to form an opening which may be closed by means of a fibrous porous cotton or similar plug indicated at 6. Each of the sections 2 is threaded exteriorly of its open end, the threads preferably being formed on a recessed portion indicated at 7. The two sections are designed to be coupled together by means of an internally threaded connector of metal or other suitable material indicated at 8 arranged to engage the threads on the portions 7. The connector 8 may be formed of sheet metal and is preferably such as to be either flush with or completely within the cylindrical surface defined by the exterior surfaces of the aligned sections.

Interposed between the sections there may be provided a disc 10 having perforations 12 therein, which disc is retained in proper position between the edges of the open ends of the sections by reason of its diameter, which is greater than that of the interior of the sections. The openings 12 may be arranged in any desired fashion but preferably a central opening is provided which has at least the diameter of the open mouths of the sections.

The use of the container will be obvious from prior practice. Each section may be filled with washed and cleaned manure or other growing medium and the two sections then coupled together with the disc 10 between them and separating the contents. A drill may then be driven either entirely through both sections or through one and then the other to provide a continuous opening. Sterilization then takes place and inoculation is accomplished by the insertion of one or more, in this case preferably of four, particles of spawn-containing material. Plugs 6 are then inserted and the containers stacked on their sides for the development period. The containers are preferably arranged on shelves having widths approximating the total length, there being passages between adjacent stacks of shelves. Access of air to each container at both ends thereof is provided and while obviously no rapid currents of air may pass through the porous plug 6, the relatively slight pressure differences which will exist due to currents of air through the passages will cause slow circulation through the containers.

When the development is complete, as may be ascertained by inspection, the containers may be delivered to the growers, or they may be emptied before shipment and the contents packed suitably for shipment. The emptying is accomplished by separating the two sections to thus obtain individual cakes of standard size which can be handled in the conventional manner. The cakes may be readily removed from the sections by reason of the cylindrical or tapering inner walls of the sections. The partition 12 will substantially prevent the two portions from growing together, though if any growth through the partitions occurs, breaking apart of the two cakes is easily accomplished.

Besides the advantage offered by the improved container in promoting uniform growth of the spawn, there is a further advantage of securing circulation during sterilization which renders it particularly effective.

Instead of providing only two sections, it will be obvious that more than two may be provided by including, for example, between two such sections as those shown, one or more additional cylindrical ones, all being coupled together by coupling bands such as 8. Such additional sections, or all or any of the sections, may be provided with side openings to facilitate and make more uniform the inoculation, ventilation and development of the spawn.

Figure 2:
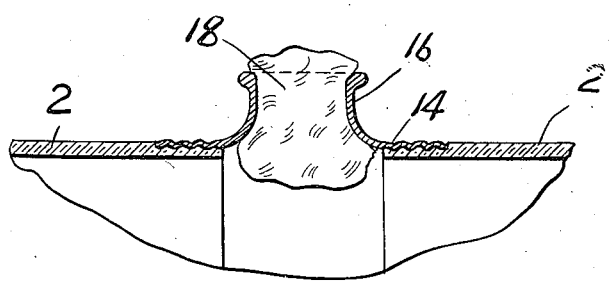
Fig. 2 is a fragmentary sectional view showing a modification.

Additional circulation and ease of inoculation may be provided in a two-section container by a relatively slight modification of the coupling band 8. Such arrangement is illustrated in Fig. 2, in which a wider coupling band 14 is provided having a side opening 16 which, as well as the opening 6, may be closed by a porous plug such as indicated at 18. A transverse opening may be drilled and central inoculation provided therethrough. Such containers may be arranged during the development period so that the side openings, as well as the ends, communicate with the atmosphere.

It will be clear that numerous other variations may be made in the embodiment of the invention such as, for example, by modification of the shapes or sizes of the various sections, without departing from its scope as defined in the following claims.

What I claim and desire to protect by Letters Patent is:

1. A container for mushroom spawn culture or the like including a plurality of sections, each of at least two of said sections comprising a body having an open end at least as large as the maximum cross-section of the body and a smaller aperture, porous closures for said apertures to prevent contamination but permit passage of air, and means for coupling said sections together.

2. A container for mushroom spawn culture or the like including a plurality of sections, each of at least two of said sections comprising a body having an open end at least as large as the maximum cross-section of the body and a smaller aperture, porous closures for said apertures to prevent contamination but permit passage of air, and means for coupling said sections together, said apertures being so located when the sections are coupled together that they are on opposite sides of the contents and circulation of air through the contents is thereby promoted.

3. A container for mushroom spawn culture or the like including a plurality of sections, each of at least two of said sections comprising a body having an open end at least as large as the maximum cross-section of the body and a smaller aperture, porous closures for said apertures to prevent contamination but permit passage of air, and means for coupling said sections together, said coupling means having an aperture therein furnishing access to the interior of the container, and a porous closure for the last mentioned aperture to prevent contamination but permit passage of air.

4. A container for mushroom spawn culture or the like including a plurality of sections, each of at least two of said sections comprising a body having a wide open end and a smaller aperture at its other end, porous closures for said apertures to prevent contamination but permit passage of air, and means for coupling said sections together.

5. A container for mushroom spawn culture of the like including a plurality of sections, each of at least two of said sections comprising a body having a wide open end and a smaller aperture at its other end, porous closures for said apertures to prevent contamination but permit passage of air, means for coupling said sections together, and at least one perforated partition at the junction of adjacent sections.

HENRY H. PERRY.